United States Patent [19]

Ruegg

[11] Patent Number: 5,071,546
[45] Date of Patent: Dec. 10, 1991

[54] FILTERING DEVICE, PARTICULARLY A SUCTION FILTER

[76] Inventor: Heinz Ruegg, Brugg, Switzerland

[21] Appl. No.: 921,341

[22] Filed: Oct. 20, 1986

[30] Foreign Application Priority Data

Oct. 22, 1985 [CH] Switzerland ............................ 4543/85

[51] Int. Cl.[5] ........................ B01D 29/05; B01D 35/18
[52] U.S. Cl. ...................................... 210/148; 210/455
[58] Field of Search ......................... 210/184, 185, 455

[56] References Cited

U.S. PATENT DOCUMENTS

| | | | |
|---|---|---|---|
| 932,408 | 8/1909 | Müller | 210/455 |
| 1,135,080 | 4/1915 | Vandercook | 210/455 |
| 1,294,463 | 2/1919 | Hills | 210/185 |
| 1,661,290 | 3/1928 | Jewett | 210/455 |
| 1,769,388 | 7/1930 | Prentice | 210/185 |
| 2,345,697 | 4/1944 | Boyce | 210/184 |
| 2,736,434 | 2/1956 | Yacoe | 210/184 |

FOREIGN PATENT DOCUMENTS 502905 7/1930 Fed. Rep. of Germany ...... 210/185
600285 7/1934 Fed. Rep. of Germany ...... 210/184

Primary Examiner—W. Gary Jones

[57] ABSTRACT

In the case of a horizontal filter surface, a base plate together with U-shaped bars fixed to the surface thereof form the support for the filter surface. Between the bars, the profile legs form drainage pipes for the filtrate. The passage of the bars is used as a pipe for a heating or cooling medium. At their ends, the bars are interconnected by connecting channels in such a way that the bars form a single pipe, the heating or cooling medium being supplied by an inlet pipe connection and is removed at the end of the pipe by an outlet pipe connection. The filtrate collecting in the pipes is drained off by the drain pipe connection. The arrangement ensures a good heat transfer to the filter cake located on the filter surface and also constitutes an uncomplicated, inexpensive solution, because the bars simultaneously form the drainage pipes for the filtrate.

4 Claims, 2 Drawing Sheets

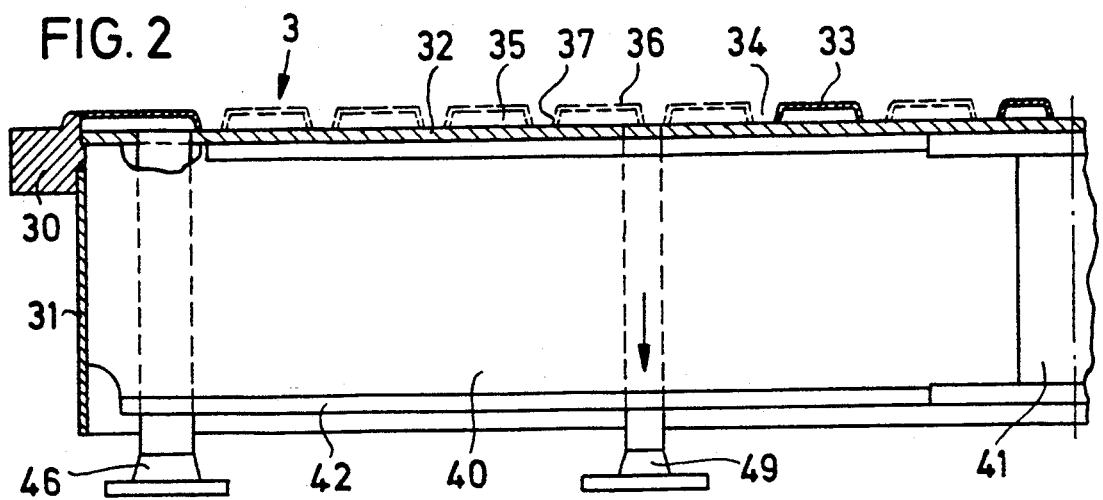
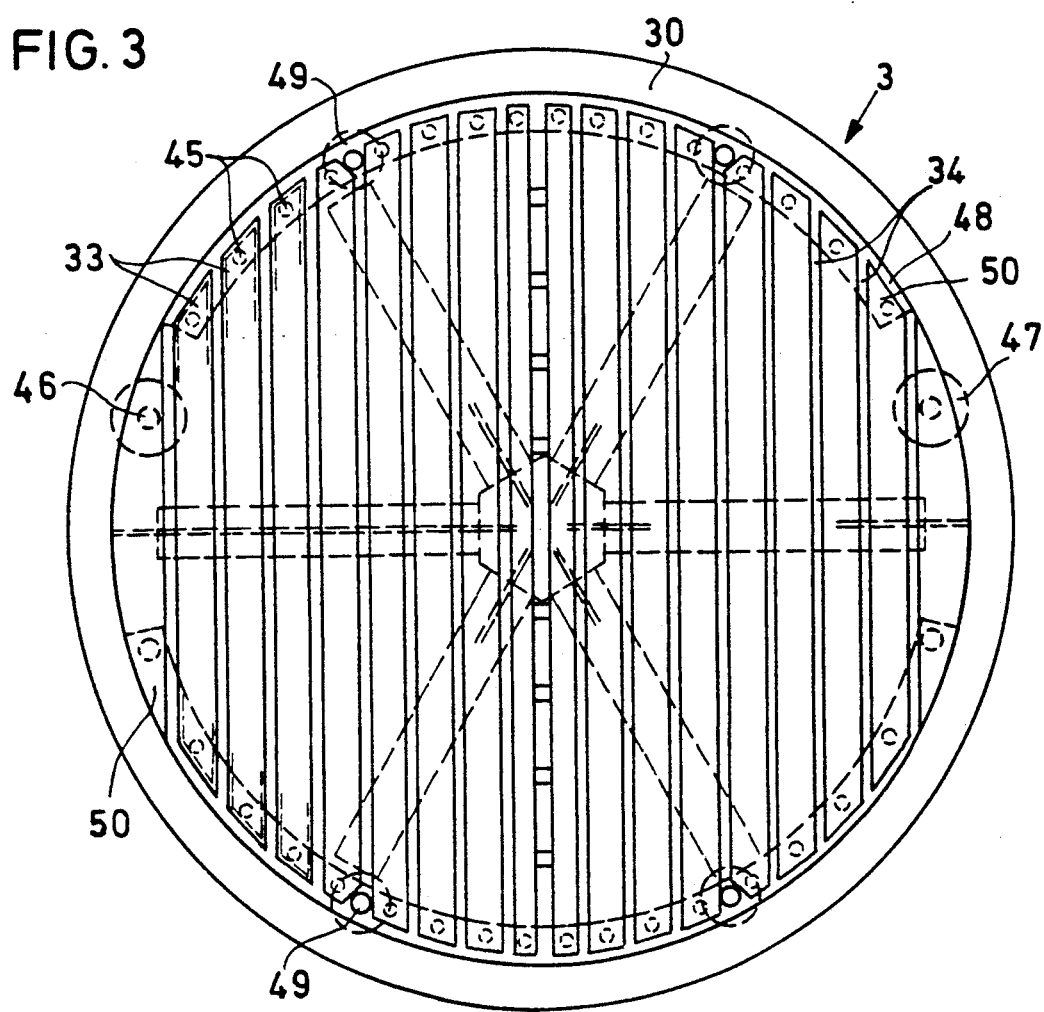

5,071,546

FILTERING DEVICE, PARTICULARLY A SUCTION FILTER

BACKGROUND OF THE INVENTION

The present invention relates to a filtering device and in particular to a nutsch or suction filter for filtering suspensions. There is provided a horizontal filter surface arranged in a cylindrical casing. The filter surface is supported on the bottom of the casing and is constructed either as a perforated surface that is covered by a filter cloth or as a porous plate, the filter surface being subject to pressure or vacuum action.

The suction filter is a known form of intermittently operating filtering devices. Surface filtration takes place in such a suction filter and it is also possible to process suspensions with high solids concentrations. A suction filter has a horizontal filter surface, which is constructed as a screen-covered filter cloth or as a solid, porous plate. Surface filtration takes place on the filter surface, a solids layer of increasing thickness forming on the layer during filtering and which must be periodically removed. Various processes are known for removing this solid material. Apart from tilting over the suction filter and swinging the bottom down, it is known to shovel out the filter cake formed on the filter surface, for which a discharge mechanism can be used. It is known to use as the discharge mechanism a stirrer which, apart from discharging the filter cake, can also be used for flattening or smoothing out the cracks which form in the filter cake.

If it is also necessary to dry the filter cake in the suction filter, this can take place by incorporating a heating means. It is known to fit heating coils to the casing of the filtering device for supplying the necessary heat. It is also known to provide a cavity, subject to the action of a heating medium on the underside of the bottom surface on which the filter surface is supported. This heating means arranged below the casing bottom constitutes a relatively complicated solution, because a number of passages must be provided to act as a drainage system for removing the filtrate.

SUMMARY OF THE INVENTION

One object of the present invention is to so develop a filtering device of the aforementioned type, in which an effective heating or cooling device can be provided on the casing bottom, which, on the one hand, permits an intense heat transfer to the complete casing bottom and on the other hand, can be manufactured at relatively low cost.

According to the present invention this object is achieved in that pipes or lines are laid on the casing bottom and on these the filter surface is supported. Between the pipes or lines drainage ducts or passages are formed for the filtrate. Due to the fact that the lines or pipes are laid on the casing bottom, it is possible to form the drainage passages for the filtrate without involving additional effort and expenditure.

The pipes are appropriately in the form of half-shell-like bars, whose longitudinal edges are mounted on the casing bottom and are connected thereto by welding, for example.

BRIEF DESCRIPTION OF THE DRAWINGS

The invention is described in greater detail hereinafter relative to non-limitative embodiments and with reference to the attached drawings, wherein like referenced characters designate like parts. In the drawing:

FIG. 2 is a cross-section in elevation of the bottom of a suction filter casing (not shown); and FIG. 3 is a plan view of the bottom according to FIG. 2, but on a smaller scale.

DETAILED DESCRIPTION OF THE PREFERRED EMBODIMENTS

Figure 1:
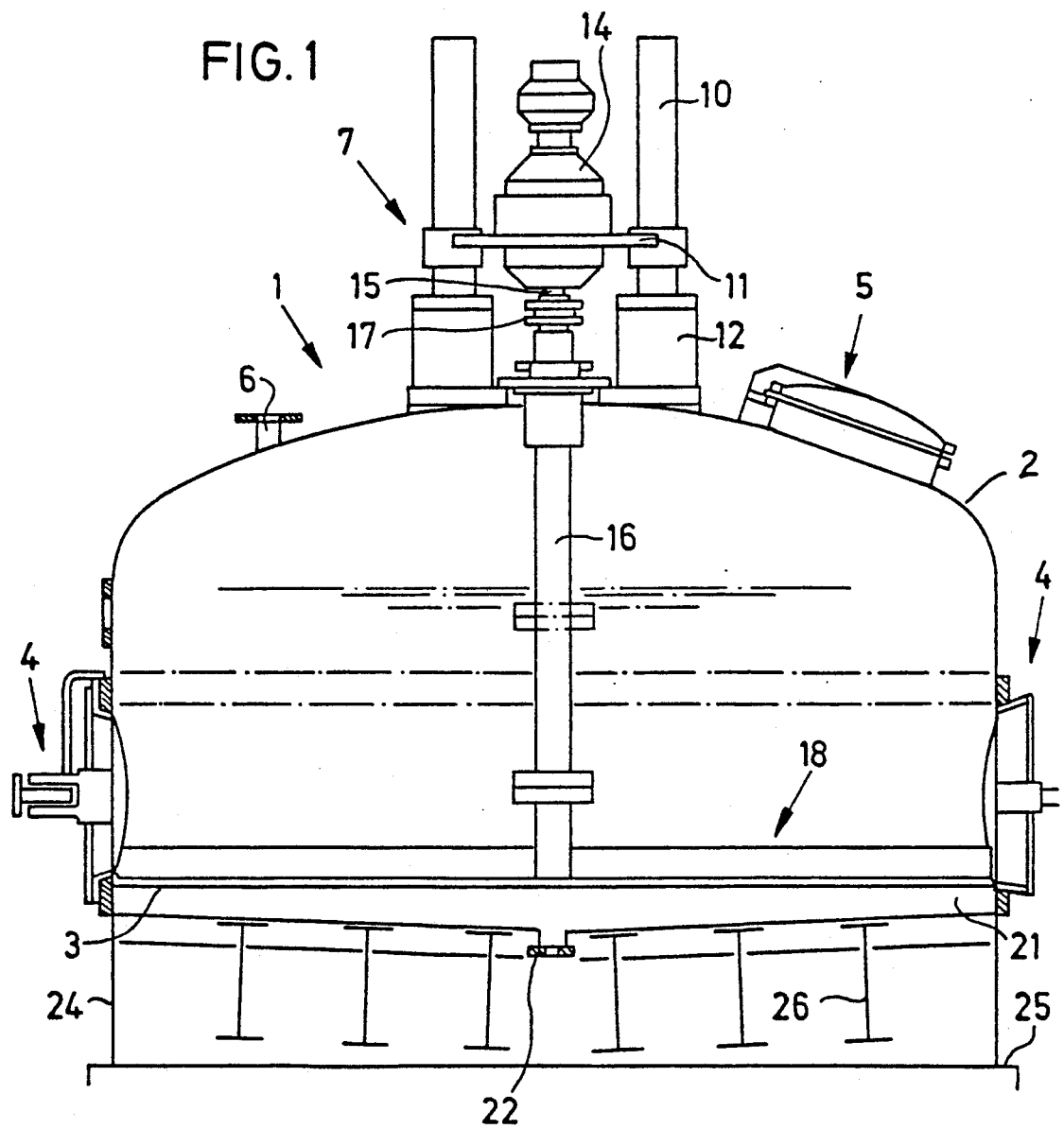
FIG. 1 is a cross-section in elevation through a diagrammatically shown suction filter.

FIG. 1 diagrammatically shows a known suction filter, on which can be used the invention described hereinafter. The suction filter 1 has a casing 2, which is generally cylindrical. The casing 2 is closed or sealed by a horizontally positioned bottom 3. In FIG. 1, the bottom 3 is non-detachably connected with the casing 2. Therefore, there are two sealing covers 4 in the casing wall and by means of these the filter cake that forms in the interior of the casing 2 can be removed. A further sealing cover 5 is arranged on the lid part, which permits access to the interior of the casing 2. On the lid part of casing 2 there is also provided a pipe connection 6, by means of which e.g. the suspension to be filtered can be introduced into the casing interior.

On the bottom 3 of the casing 2 is supported a filter surface that is not shown. The filter surface can be constructed in any known manner as a filter cloth-covered screen or as a solid, porous plate. The way in which the filter surface is constructed is unimportant in the context of the present invention, so that no further reference will be made to this.

A lifting device 7 is mounted on the lid part of the casing 2 and comprises two hydraulic linear motors 10, which are interconnected by a connecting platform 11. The linear motors 10 are secured to fittings 12, which are supported on the lid part of the casing 2.

On the connecting platform 11 is mounted a motor drive 14, for example, an electric geared motor, to whose drive shaft 15 is coupled a stirrer shaft 16 by means of coupling 17. To the lower end of stirrer shaft 16 is fixed a stirrer 18 having a plurality of blades. The stirrer 18 can fulfill two functions, namely the smoothing out of the filter cake on the one hand and the discharge of the latter on the other.

The bottom 3 has passages (not shown) through which the filtrate follows into a filtrate drain 21, which is constructed as a cavity arranged beneath the bottom 3, from which the filtrate can be removed through a centrally arranged drainage pipe 22.

The outer circumference of the bottom 3 is provided with a circular wall 24, which has a pedestal 25 enabling the suction filter to be supported on a substrate. Webs 26 formed from channel sections are used for reinforcing the bottom 3.

For the operation of the filter according to FIG. 1, it is important that the stirrer 18 can be raised with the aid of the lifting device 7 in accordance with the surface of the filter cake which is being formed. In the construction according to FIG. 1, the bottom 3 is not removably connected to the casing 2, but can be provided with a flange enabling the bottom 3 to be screwed together with a correspondingly positioned flange at the lower end of the casing 2. The suction filter shown in FIG. 1 is constructed as a pressure filter. If it is only used as a vacuum filter, there is no need for the lid part to be constructed as a casing seal and instead can be omitted, the lifting device 7 then being fixable to a cross or vertical member supported on the casing 2.

FIGS. 2 and 3 show the bottom 3 of a suction filter, which can, for example, be connected to the casing 2 according to FIG. 1 by a flange means. To this end, the bottom 3 has a fastening flange 30, which surrounds a circular wall 31 at its upper end and is connected to a base plate 32. Bars 33 are arranged in parallel on the top of the base plate 32 and a gap 34 is left between each of the bars 33. As can be gathered from FIG. 3, the base plate 32 is covered by a plurality of parallel bars 33, which only leave relatively small gaps 34 therebetween.

The bars 33 have half-shell-like profile and together with the base plate 32 each form a closed pipe with a narrow, approximately rectangular passage 35. The profile or section of the bars 33 is approximately U-shaped and its web 36 has a much greater width than the height of its legs 37. As a result of this shape, the webs 36 form a bottom on the base plate 32 which is only interrupted by the narrow gaps 34. The filter surface can now be supported on the bottom formed by the webs 36 and, as stated, may be constructed by a filter cloth-covered screen or a solid, porous plate.

The base plate 32 is reinforced by radial ribbed walls 40, which extend from a central column 41 outwardly to the circular wall 31 and are provided with belts 42.

The pipes formed by the bars 33 are connected in series and for this purpose the bars 33 are sealed at their end faces. In this region bores 45 are provided in the base plate 32, which are so interconnected on the underside of the base plate 32 that a single throughchannel is formed. The latter is used for the passage of a heating medium, which is supplied through an inlet pipe connection 46 as shown in FIG. 2 and is removed by an outlet pipe connection 47 as shown in FIG. 3, which is arranged on the opposite side of the base plate 32. As a result of the parallel arrangement of the bars 33, the gaps 34 constitute filtrate drains without any additional means being necessary. The filtrate initially runs through the gaps 34, collects in a circumferential channel 48, which is bounded by the casing wall and then flows through drainage pipes 49, a plurality of which are provided on the circumference of base plate 32. The openings of drainage pipes 49 constitute a first set of bores extending through the base plate 32 while vertical openings 45 constitute a second set of bores extending through base plate 32.

The interconnection of the bores 45 takes place by a circular ring piece 50 arranged on the underside of the base plate 32. In FIG. 3 two such ring pieces 50 face one another and in them are provided connecting channels. These channels interconnect, in each case, two juxtaposed bars 33 in such a way that a single through-channel is formed.

An additional reinforcement of the bottom 3 is achieved by the described guidance of the medium on the top surface of the base plate 32. The bars 33 can have relatively thin walls, so that a favorable heat transfer is achieved on the filter surface. As a result of the profile of the bars 33 arranged on the surface of the base plate 32 and connected thereto, a relatively uncomplicated arrangement is provided for guiding the medium, because the filtrate drains are formed without using additional means.

The webs 36 of the bars 33 on the top surface of the base plate 32 cover approximately 80% of the latter, leading to an intense heat transfer both on heating and on cooling.

The aforementioned bottom can be used both for drying and for crystallization and is suitable for use in a pressure or vacuum filter. The channel can also be subdivided into partial channels, a number of inlet and outlet pipe connections corresponding to the number thereof then being provided.

I claim:

1. A suction filter device for filtering suspensions, said device comprising:
    a vertical hollow cylindrical casing having a sealed horizontal bottom section, said section having an upper and lower surfaces, the section having means defining a first bore set constituted by a plurality of vertical bores which extend therethrough and which are spaced in the casing along the periphery of said section;
    a plurality of spaced apart horizontally elongated parallel members secured to the upper surface of the section and having opposite ends which are closed and sealed to the section, the member ends being spaced inwardly from the first bore set, each member having in vertical cross section the shape of an inverted U with vertical legs and a flat horizontal interconnection web, the length of the web being longer than that of the legs, all webs lying in a common horizontal plane, each member being interconnected with that portion of the section which it overlies in such manner as to form a corresponding horizontal conduit, said section having means defining a second bore set constituted by a plurality of vertical bores which extend through the section and are disposed in each of said portions adjacent each member end;
    first means disposed below the section and cooperating with the second set bores to form a single through channel with said horizontal conduits; and
    second means disposed below the section and including first and second spaced pipe connections functioning respectively as an inlet to and an outlet from the single channel and adapted to receive a heating medium and to circulate the medium through the single channel, whereby when a porous horizontal filter is disposed in the casing overlying the webs, and a suspension is collected thereon, the filtrate flows between the members and out of the first set bores and the heating medium heats the residue collected on the filter.

2. The device of claim 1 wherein the bottom section comprises a plate reinforced and supported by ribs.

3. The device of claim 1 wherein the first means includes first and second spaced horizontal semicircular ring elements, the first element cooperating with the first set bores and the second element cooperating with the first set bores.

4. The device of claim 3 wherein a first pipe connection functioning as said inlet is connected to the first element and a second pipe connection functioning as said outlet is connected to the second element.

* * * * *